Nov. 24, 1970  W. J. QUINLAN ET AL  3,541,629
DETACHABLE WINDSHIELD WIPER BLADE UNIT
Filed April 30, 1968  2 Sheets-Sheet 2
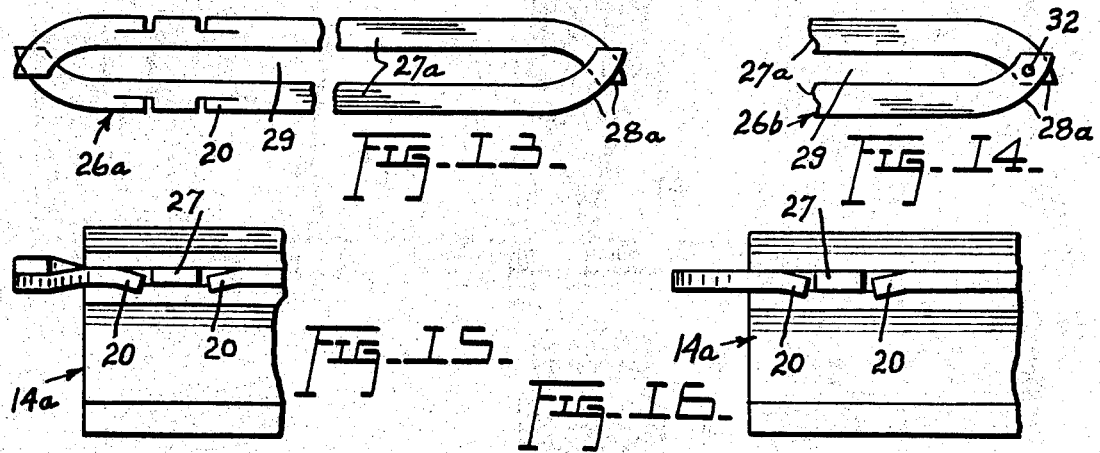
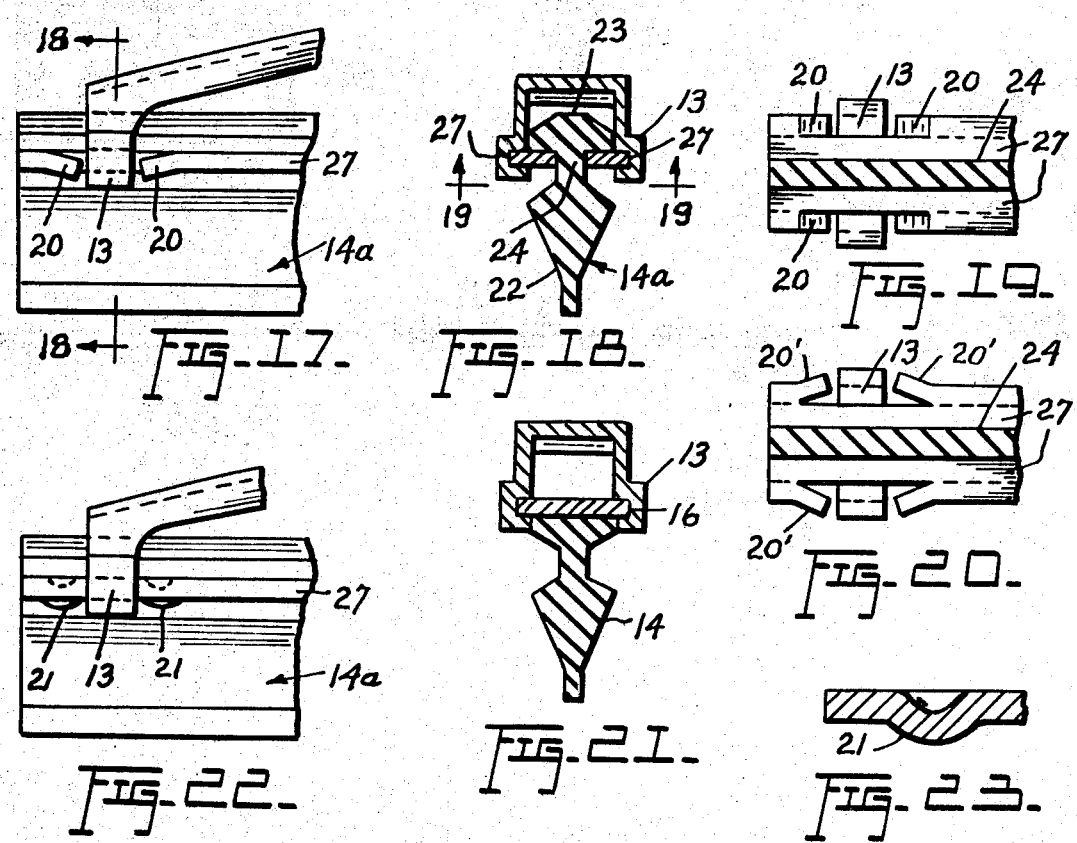
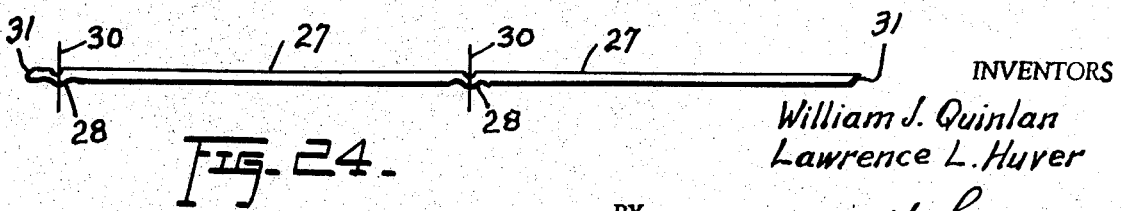
INVENTORS
William J. Quinlan
Lawrence L. Huyer
BY
Munson H. Lane
ATTORNEY United States Patent Office 3,541,629
Patented Nov. 24, 1970

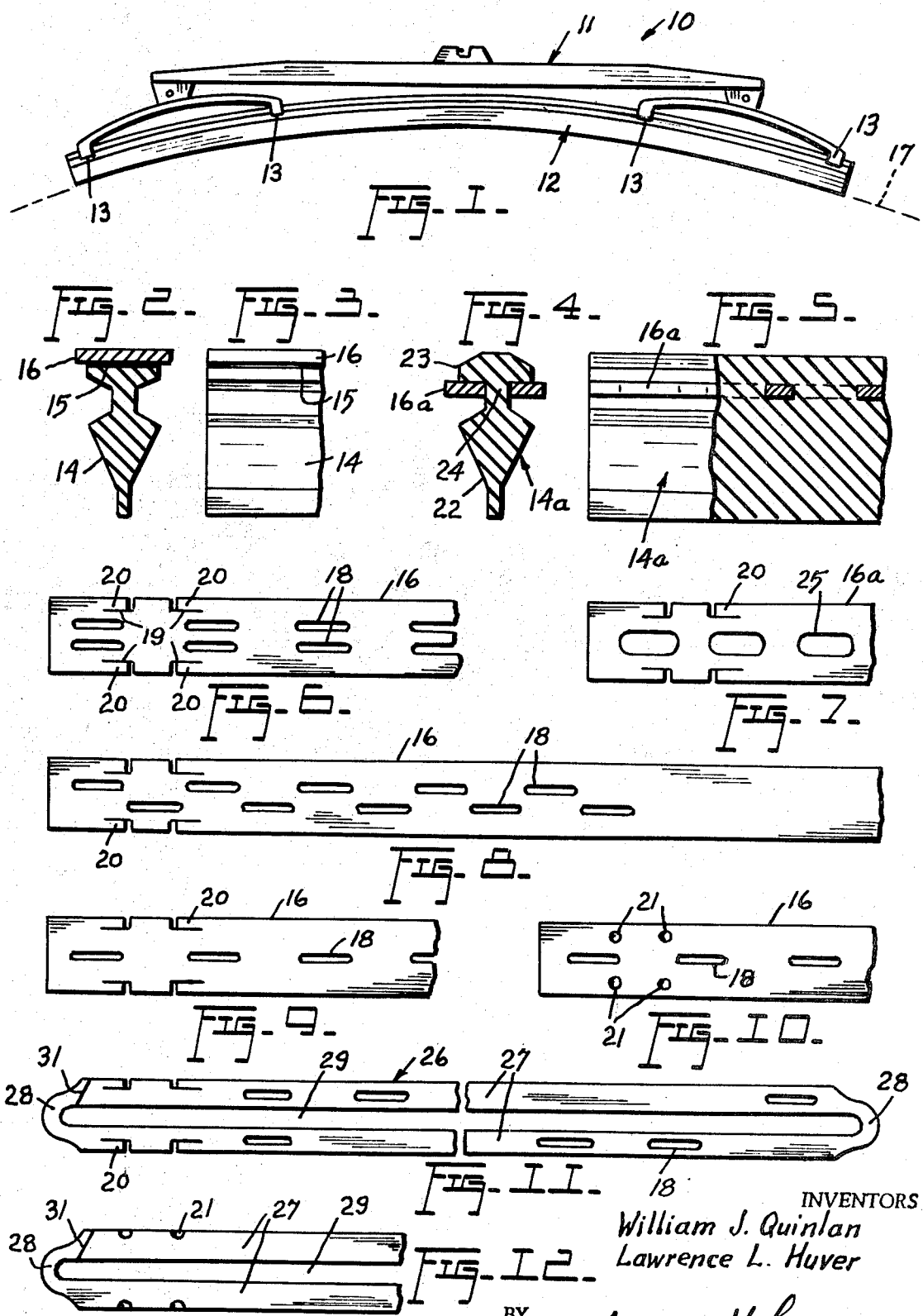

3,541,629
DETACHABLE WINDSHIELD WIPER BLADE UNIT
William J. Quinlan and Lawrence L. Huver, Hastings, Mich., assignors to Hastings Manufacturing Company, Hastings, Mich., a corporation of Michigan
Filed Apr. 30, 1968, Ser. No. 725,325
Int. Cl. B60s 1/38
U.S. Cl. 15—250.42
21 Claims

ABSTRACT OF THE DISCLOSURE

A flexible wiper element supported by a resiliently flexible backing strip. In some embodiments the wiper element and backing strip are bonded together. In other embodiments the backing strip includes a pair of transversely spaced strip members which retain the wiper element therebetween. Longitudinal edge portions of the backing strip are embraced by the usual claws of a wiper pressure unit, and longitudinally spaced spring detents are provided on the backing strip to releasably or snap-fittingly receive one of the claws between them, whereby to releasably hold the blade unit and pressure unit in assembled relation.

This invention relates to new and useful improvements in windshield wiper blade assemblies of the flexible type such as may be used on either flat or curved windshields, and in particular the invention concerns itself with certain improvements in blade assemblies utilizing a pressure unit with a detachable blade unit.

The principal object of the invention is to provide a detachable blade unit which may be quickly and easily applied to or removed from the pressure unit and which is dependably held in assembled relation with the pressure unit without the use of separate parts such as clips, springs, screws, or the like, so that there is no possibility of such separate parts becoming lost while the blade unit is being replaced.

Another important object of the invention is to provide an improved blade unit consisting of a flexible wiper element supported by a resiliently flexible backing strip or flexor in such manner that the action of the pressure unit on the backing strip assures a proper wiping contact of the full length of the wiper element with either a flat or a curved windshield.

Another object of the invention is to provide the blade unit with a backing strip or flexor of novel construction which may be easily and economically manufactured and readily assembled with the wiper element.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 1 is a side elevational view of a blade assembly including a pressure unit and blade unit;

FIG. 2 is an enlarged cross-sectional view of one embodiment of the blade unit;

FIG. 3 is a fragmentary side elevational view of the blade unit shown in FIG. 2;

FIG. 4 is a cross-sectional view of another embodiment of the blade unit;

FIG. 5 is a fragmentary view, partly in side elevation and partly in longitudinal section of the blade unit of FIG. 4;

FIG. 6 is a fragmentary plan view of the backing strip used in the blade unit of FIG. 2;

FIG. 7 is a fragmentary plan view of the backing strip used in the blade unit of FIG. 4;

FIG. 8 is a fragmentary plan view of another embodiment of the backing strip;

FIG. 9 is a fragmentary plan view of another embodiment;

FIG. 10 is a fragmentary plan view of another embodiment;

FIG. 11 is a plan view showing another modification of the backing strip;

FIG. 12 is a fragmentary plan view of another modification;

FIG. 13 is a plan view of still another modification;

FIG. 14 is a fragmentary plan view of another modification;

FIG. 15 is a fragmentary side elevational view of a blade unit using the backing strip of FIG. 13;

FIG. 16 is a fragmentary side elevational view of a blade unit using the backing strip of FIG. 11;

FIG. 17 is a fragmentary side elevational view showing a claw of the pressure unit applied to a blade unit utilizing spring detents on the backing strip;

FIG. 18 is a cross-sectional view, taken substantially in the plane of the line 18—18 in FIG. 17;

FIG. 19 is a fragmentary sectional view, taken substantially in the plane of the line 19—19 in FIG. 18;

FIG. 20 is a view similar to that in FIG. 19 but showing a modified arrangement of the spring detents;

FIG. 21 is a view similar to that in FIG. 18 but with the blade unit of FIG. 2;

FIG. 22 is a fragmentary side elevational view showing a claw of the pressure unit applied to a blade unit utilizing boss type detents;

FIG. 23 is an enlarged fragmentary sectional detail of one of the boss type detents; and FIG. 24 is a developed plan view of the backing strip of FIG. 11 or 12, showing the same on a reduced scale and prior to its bending into shape.

Before describing the invention in detail it is to be noted that three basic types of the blade unit are disclosed, each embodying a different structural combination of a wiper element and backing strip. Moreover, two different types of longitudinally spaced spring detents are disclosed for yieldingly holding a claw of the pressure unit assembled on a backing strip of the blade unit of any one of the three basic types, and several modifications of the backing strip are also disclosed, any one of which may utilize either of the two types of releasable spring detents. For sake of simplicity of illustration only a few of the possible combinations have been shown in the drawings and it should be understood that various other combinations are also possible.

Referring now to the accompanying drawings in detail, FIG. 1 shows a windshield wiper blade assembly 10 consisting of two basic units, namely, a pressure unit 11 and a blade unit 12, the blade unit being detachably connected to the usual claws 13 of the pressure unit so that the blade unit may be easily replaced.

One basic type of blade unit in accordance with the invention is shown in FIGS. 2 and 3, the same comprising an elongated, flexible wiper element 14 made of rubber, or the like, which is adhesively bonded as at 15 to a backing strip or flexor 16. The backing strip, which may be made of metal, is resiliently flexible in a plane normal to its surfaces, but is substantially rigid against lateral or edgewise deflection. Thus, when the blade unit is applied to the pressure unit 11, the flexibility of the backing strip as stated permits the full length of the wiper element 14 to properly contact the windshield 17, regardless of whether the windshield is flat or has varying degrees of curvature.

The backing strip 16 may be imperforate, but in order to enhance its flexibility in a plane normal to its surfaces, the strip may be provided with a longitudinal row of perforations or slots 18 as shown in FIGS. 9 and 10. Alternatively, two or more rows of such perforations may be provided, and the perforations in the two or more rows may be either transversely aligned as shown in FIG. 6 or longitudinally staggered as shown in FIG. 8. Also, if greater flexibility is desired in the end portions of the strip than in the center portion thereof, the perforations may be provided only in the end portions and the center portion may be left imperforate, as shown in the right-hand end of FIG. 8.

In any event, when the blade unit 12 is assembled to the pressure unit 11, the claws 13 of the pressure unit slidably engage the longitudinal edge portions of the backing strip 16 as will be apparent from FIG. 21, whereby the blade unit is free to flex in passing over the windshield contour while the longitudinal distance or spacing between the claws remains substantially the same. However, to prevent separation of the blade unit from the pressure unit by sliding, one of the pressure unit claws is anchored at a fixed point to the backing strip 16 of the blade unit by releasable spring detent means which holds the blade unit and pressure unit assembled but still permits the blade unit to be detached when desired for purposes of replacement. Any one of the several claws 13 of the pressure unit may be used for such anchoring purposes by providing the releasable spring detent means at an appropriate point along the length of the backing strip.

Two different, selectively usable types of detent means are disclosed, one of these being the spring detent type shown, for example, in FIGS. 6-11, 13 and 15-19. Here the longitudinal edge portions of the backing strip are formed with transversely aligned pairs of longitudinally spaced, substantially L-shaped slits 19 which are open at the edges of the strip and define two pairs of spring detents 20. These spring detents are angularly offset as is best shown in FIGS. 15-17 so as to project outside the cross-section of the backing strip in a direction normal to the strip surfaces, and the longitudinal spacing between the spring detents is substantially the same or slightly larger than the longitudinal dimension of the pressure unit claw 13 which is to be accommodated between the spring detents, as will be apparent from FIG. 17. When the blade unit is applied to the pressure unit, the claws 13 of the pressure unit are slid along the longitudinal edge portions of the backing strip until a selected one of the claws encounters a first pair of transversely aligned spring detents. The detents 20 have resilient characteristics which enable them to retract within the cross-section of the backing strip as the claw passes over them, whereupon they spring back to their normal, projected position and the claw is then retained in a seated or anchored position on portions of the backing strip between the two pairs of spring detents. Thus the blade unit is held assembled to the pressure unit and when the blade unit is to be replaced, a pair of the spring detents 20 are retracted to permit sliding of the claw outwardly from between the two pairs of detents and subsequent sliding separation of the blade unit from the pressure unit.

A slightly modified arrangement of the same type of spring detents is shown in FIG. 20, wherein the detents 20', rather than being offset in a plane normal to the backing strip surfaces, are offset laterally or edgewise in the plane of the strip surfaces, but otherwise the action of the detents is the same as already described.

The second type of releasable or snap-fitting spring detent means is shown, for example, in FIGS. 10, 12, 22 and 23. The same comprises transversely aligned, longitudinally spaced, concavo-convex bosses 21 which are formed at or closely adjacent to the longitudinal edges of the backing strip and project from one of the strip surfaces, as illustrated.

The longitudinal spacing of the detents 21 is substantially the same or slightly larger than the longitudinal dimension of the pressure unit claw 13 which is to be seated between the detents in a manner similar to the seating of the claw between the aforementioned detents 20 or 20'. However, the boss type detents 21 are not resilient to the same extent as the detents 20 or 20', and thus the detents 21 are carefully proportioned in size and shape so that upon application of sliding pressure the claw may be forced over the detents, either into a seated position between the detents when the blade unit is being installed, or out of its seated position when the blade unit is being removed. In any event, as in the instance of the spring detents 20 or 20', the claw is passed into its seated position with a releasable or snap-fitting action which holds the parts assembled until they are manually separated.

The releasable detent means 20, 20' or 21 may be provided in transversely aligned relation on both longitudinal edge portions of the backing strip, or such means may be provided on one longitudinal edge portion only, if so preferred.

A second basic type of blade unit in accordance with the invention is shown in FIGS. 4, 5 and 7. Here the wiper element 14a has a body portion 22, a crown portion 23 and a cross-sectionally reduced neck portion 24, and the backing strip 16a is provided with a longitudinal row of openings or slots 25 having the neck portion 24 of the wiper element extending therethruogh. In manufacture, the wiper element 14a is extruded in a conventional manner while the backing strip 16a is being fed through the extruder, so that the two components become unitized by bonding of the crown portion 23 and of the neck portion 24 to the backing strip. The openings 25 not only serve to accommodate the neck portion 24, but also enhance the resilient flexibility of the backing strip as already explained in connection with the slots 18.

The backing strip 16a of the blade unit in FIGS. 4, 5 and 7 may be provided with either the spring type detent means 20, 20', or the boss type snap-fitting detent means 21, as already mentioned.

A third basic type of blade assembly of the invention is similar to the second type in that it also utilizes the wiper element 14a, but in this instance the wiper element is extruded by itself and is then installed in a separate backing strip of which several modifications are disclosed, as for example in FIGS. 11, 13 and 14.

The backing strip 26 of FIG. 11 is the preferred embodiment, the same including a pair of transversely spaced strip members 27 and a pair of closed end portions 28 which bridge the strip members together. The neck portion 24 of the wiper element 14a is received in the space 29 between the two strip members 27 and the end portions 28, disposed adjacent the ends of the wiper element 14a, prevent longitudinal sliding of the wiper element relative to the backing strip. Here again, the strip members 27 may be formed with openings 18 to enhance flexibility, and either the detent means 20, 20' or the detent means 21 may be provided on the strip members, as desired, as exemplified in FIGS. 11 and 12.

The backing strip 26 is preferably formed from a single, strip-like piece of material shown in its developed form in FIG. 24. Such a piece of material is then formed by bending in the region of the lines 30 to provide the end portions 28 when the backing strip assumes its closed configuration with the transversely spaced strip members 27, and manufacture of the strip in this manner eliminates material waste such as would otherwise be involved if the space 29 were blanked out of a wider strip of material. It is to be particularly noted that when the terminal ends 31 of the material strip in FIG. 24 are brought together as in FIG. 11, they are left in an unattached, opposing relation, that is, without being secured together. This not only permits the strip portions 27 to be spread apart for purposes of insertion or removal of the wiper element 14a, but it also permits a certain amount of twisting of the wiper element at one side without transferring the load to the opposite side of the blade unit, The two free ends 31 are preferably cut at an angle which is oblique to the longitudinal axis, so that the ends may lie in abutting relationship without any overlap and assist each other in maintaining longitudinal alignment. It will be understood that the two strip members 27 are prevented from undue spreading laterally away from the neck portion 24 of the wiper element 14a by the embracing engagement of the pressure unit claws 13 therewith.

FIG. 13 shows a modified backing strip 26a which may be used in place of the strip 26. In this instance the two strip members 27a are formed separately and include curved end portions 28a which are overlapped and suitably secured together, as by spot welding, for example, to form the closed ends of the backing strip. In another modification shown in FIG. 14, the overlapped strip member end portions 28a are secured together by a rivet 32.

While in the foregoing there have been described and shown various embodiments of the invention, other modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. A windshield wiper blade assembly comprising an elongated pressure unit and an elongated detachable blade unit, said blade unit comprising a backing strip which is resiliently flexible in a plane normal to its surfaces but is substantially rigid against lateral deflection, a resiliently flexible wiper element supported by said backing strip, said pressure unit including a plurality of claws slidably embracing longitudinal edge portions of said backing strip at longitudinally spaced points, and means cooperating with one of said claws for releasably locking the blade unit against sliding relative to the pressure unit, said backing strip including a pair of strip members transversely and spaced and unconnected from end to end having a portion of said wiper element disposed therebetween, and a pair of closed end portions bridging said strip members together adjacent the ends of said wiper element whereby to prevent longitudinal sliding of the backing strip and wiper element relative to each other, said closed end portions and said strip members being integrally formed from a single piece of material which has free terminal ends disposed in opposing and unconnected relation adjacent one of said closed end portions of the backing strip, said locking means comprising a pair of longitudinally spaced snap-fitting detents provided on at least one longitudinal edge portion of said backing strip, the spacing of said detents corresponding substantially to the longitudinal dimension of said one claw, and said one claw being movable longitudinally of the backing strip to snap-fit into and out of a seated position between said detents.

2. The device as defined in claim 1 wherein said snap-fitting detents are constituted by concavo-convex bosses formed in and projecing from said backing strip in a direction normal to the plane of the strip surfaces.

3. The device as defined in claim 1 wherein said backing strip is formed with substantially L-shaped slits open at said one longitudinal edge of the strip, spring slits defining said detents which are angularly offset to project outside the cross-section of the strip and are resiliently retractable within the confines of the strip cross-section by passage of said one claw thereover.

4. The device as defined in claim 3 wherein said detents are offset to project in a plane normal to the strip surfaces.

5. The device as defined in claim 3 wherein said detents are offset to project laterally in the plane of the strip surfaces.

6. The device as defined in claim 1 wherein said backing strip is provided with at least one longitudinally extending row of openings to enhance the resilient flexibility thereof in a plane normal to its surfaces.

7. A detachable blade unit for a windshield wiper blade assembly, said unit comprising a backing strip which is resiliently flexible in a plant normal to its surfaces but is substantially rigid against lateral deflection, a resiliently flexible wiper element supported by said backing strip, said wiper element including a body porton, a crown portion and a cross-sectionally reduced neck portion between said body and crown portions, said backing strip including a pair of strip members transversely spaced and unconnected from end to end having the neck portion of said wiper element disposed therebetween, and a pair of closed end portions bridging said strip members together adjacent the ends of said wiper element whereby to prevent a longitudinal sliding of the backing strip and wiper element relative to each other, said closed end portions and said strip members being integrally formed from a single piece of material which has free terminal ends disposed in opposing and unconnected relation adjacent one of said closed end portions of the backing strip, and a pair of longitudinally spaced detents provided on at least one of said strip members, said detents being substantially removed longitudinally from the end of the backing strip opposite said free terminal ends, said detents providing therebetween a seat for snap-fitting reception of a claw of a pressure unit to which said blade unit is detachably connected.

8. The device as defined in claim 7 wherein said strip members are provided with longitudinal rows of openings to enhance the resilient flexibility thereof in a plane normal to the strip member surfaces.

9. For use in a windshield wiper blade assembly which includes an elongated pressure unit having a plurality of claws, a blade unit comprising a backing strip which is resiliently flexible in a plane normal to its surfaces but is substantially rigid against lateral deflection, a resiliently flexible wiper element supported by said backing strip, said wiper element including a body portion, a crown portion and a cross-sectionally reduced neck portion between said body and crown portions, said backing strip including a pair of strip members transversely spaced and unconnected from end to end having the neck portion of said wiper element disposed therebetween and a pair of closed end portions bridging said strip members together adjacent the ends of said wiper element whereby to prevent longitudinal sliding of the backing strip and wiper element relative to each other, said closed end portions and said strip members being integrally formed from a single piece of material which has free terminal ends disposed in opposing and unconnected relation adjacent one of said closed end portions of the backing strip, and a pair of longitudinally spaced snap-fitting spring detents provided on at least one of said strip members, said detents being adapted to snap-fittingly receive therebetween a claw of the stated pressure unit, the space between the pair of detents corresponding substantially to the longitudinal dimensions of said claw.

10. The device as defined in claim 9 wherein said detents are constituted by concavo-convex bosses formed in and projecting from said one of said strip members in a direction normal to the plane of the strip member surfaces.

11. The device as defined in claim 9 wherein said one of said strip members is formed with substantially L-shaped slits open at one longitudinal edge of the strip member, said slits defining said detents which are angularly offset to project outside the cross-section of the strip member and are resiliently retractable within the confines of the strip member cross-section for passage of a pressure unit claw thereover.

12. The device as defined in claim 11 wherein said detents are offset to project in a plane normal to the strip member surfaces.

13. The device as defined in claim 11 wherein said detents are offset to project laterally in the plane of the strip member surfaces.

14. The device as defined in claim 9 wherein said strip members are provided with longitudinal rows of openings to enhance the resilient flexibility thereof in a plane normal to the strip member surfaces.

15. A flexible backing strip for use in a windshield wiper blade assembly which includes an elongated pressure unit having a plurality of claws adapted to engage said flexible backing strip and a wiper element having a neck portion adapted to be supported by said backing strip; said backing strip being elongated and resiliently flexible in a plane normal to its length and substantially rigid against lateral deflection, and having locking means for cooperating with one of the claws of said pressure unit for releasably locking the backing strip against sliding relative to said pressure unit, said backing strip including a pair of strip members transversely spaced and unconnected from end to end to receive a portion of said wiper element therebetween and a pair of closed end portions bridging said strip members together adjacent the ends of said wiper element whereby to prevent longitudinal sliding of the backing strip and wiper element relative to each other, said closed end portions and said strip members being integrally formed from a single piece of material which has free terminal ends disposed in opposing and unconnected relation adjacent one of said closed end portions of the backing strip and said locking means comprising a pair of longitudinally spaced snap-fitted spring detents provided on at least one longitudinal edge portion of said backing strip, the spacing of said detents being selected to correspond substantially to the longitudinal dimension of said one claw, and being adapted to detachably secure said one claw therebetween.

16. The device as defined in claim 15 wherein said detents are constituted by concavo-convex bosses formed in and projecting from said backing strip in a direction normal to the plane of the strip surfaces.

17. The device as defined in claim 15 wherein said backing strip is formed with substantially L-shaped slits open at said one longitudinal edge of the strip, said slits defining said detents which are angularly offset to project outside the cross-section of the strip and are resiliently retractable within the confines of the strip cross-section by passage of said one claw thereover.

18. The device as defined in claim 17 wherein said detents are offset to project in a plane normal to the strip surfaces.

19. The device as defined in claim 17 wherein said detents are offset to project laterally in the plane of the strip surfaces.

20. The device as defined in claim 15 wherein said backing strip is provided with at least one longitudinally extending row of openings to enhance the resilient flexibility thereof in a plane normal to its surfaces.

21. A flexible backing strip as defined in claim 15 formed by bending from a single strip of material.

References Cited

UNITED STATES PATENTS

| | | | |
|---|---|---|---|
| 2,924,840 | 2/1960 | Anderson | 15—250.42 |
| 3,035,297 | 5/1962 | Overman et al. | 15—250.36 |
| 3,097,389 | 7/1963 | Contant et al. | 15—250.42 |
| 3,156,940 | 11/1964 | Anderson | 15—250.42 |
| 3,393,419 | 7/1968 | Scinta | 15—250.42 |

FOREIGN PATENTS 862,036   3/1961   Great Britain.

ROBERT W. MICHELL, Primary Examiner